J. HETTINGER.
TELEGRAPHIC AND OTHER INSTRUMENTS AND INSTALLATIONS.
APPLICATION FILED SEPT. 18, 1918.
1,322,566.
Patented Nov. 25, 1919.
3 SHEETS—SHEET 1.
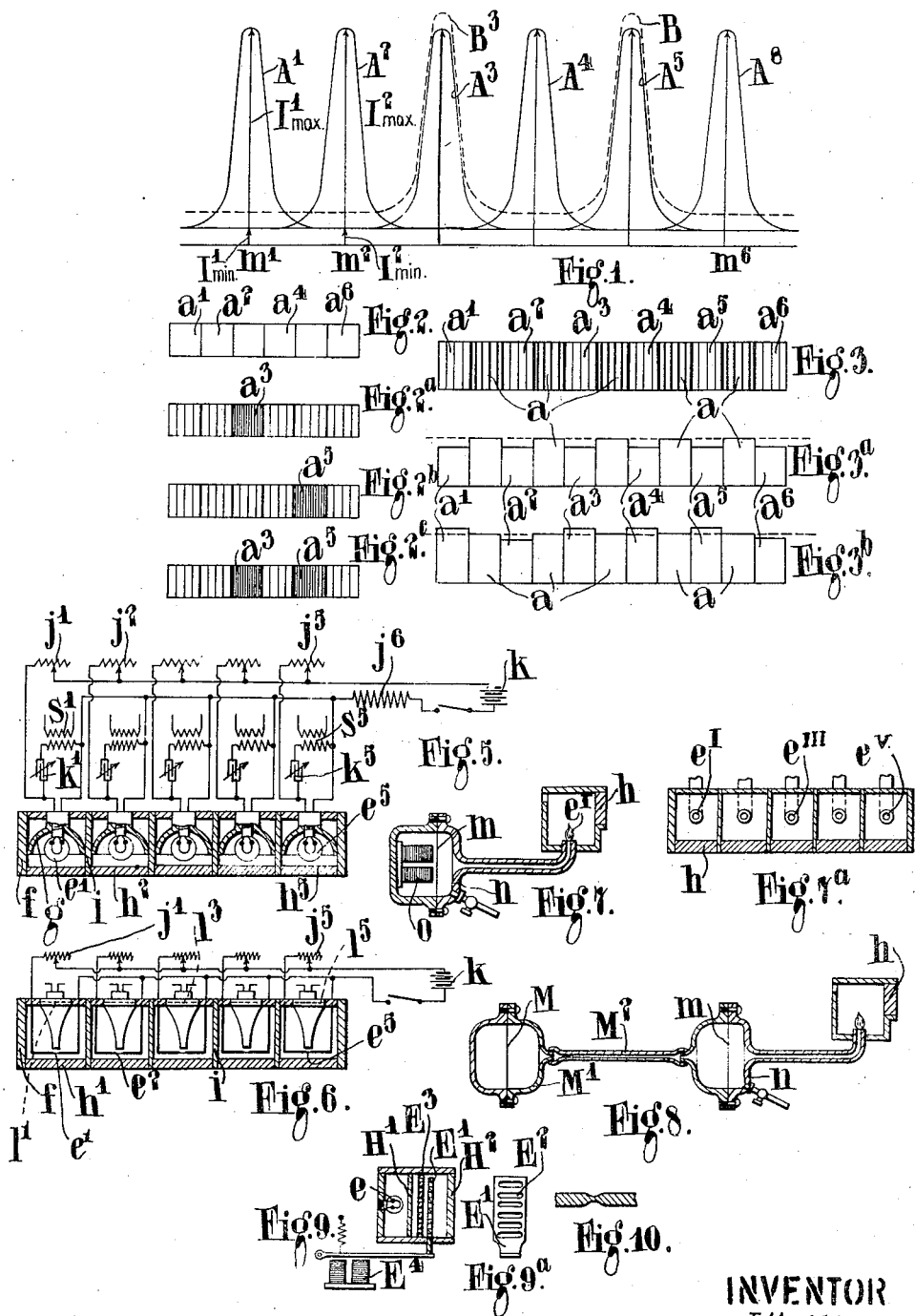

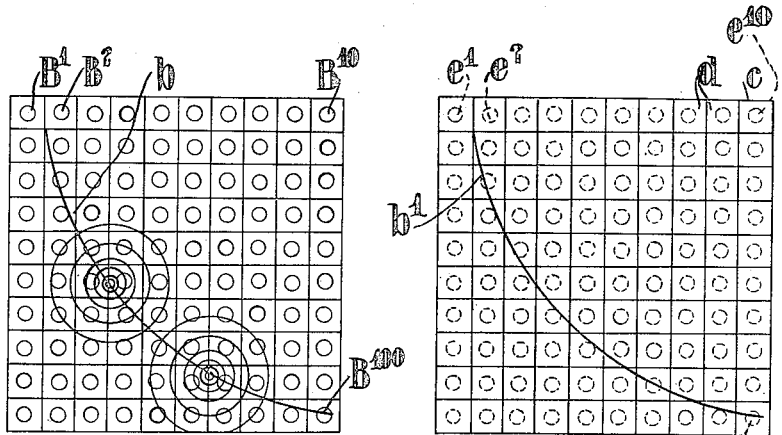
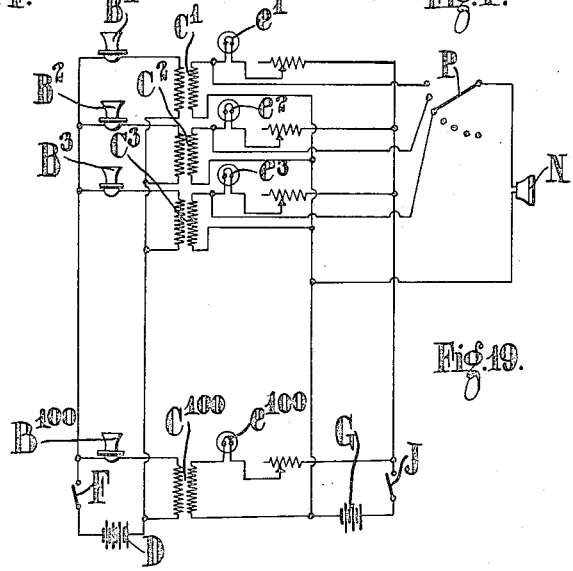
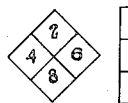 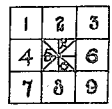 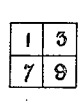

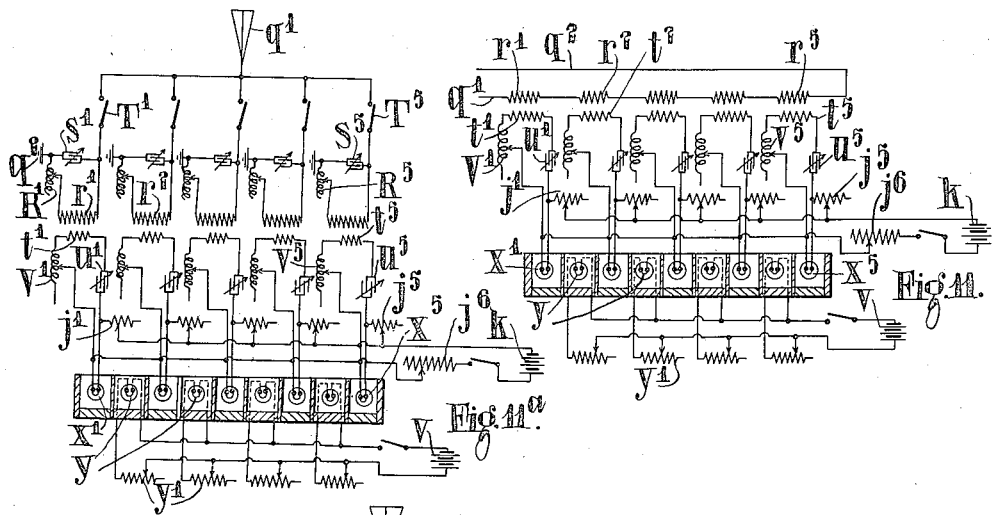
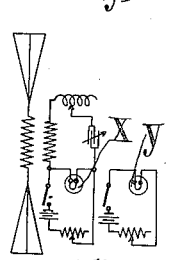
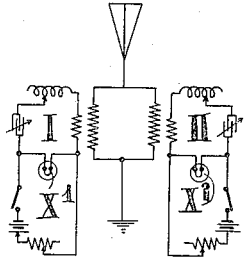
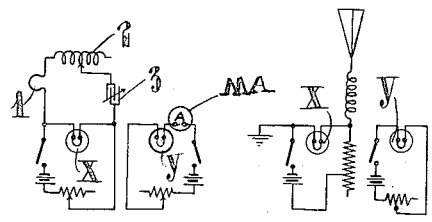
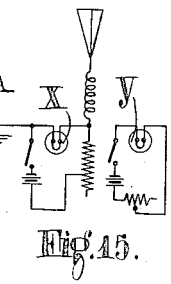
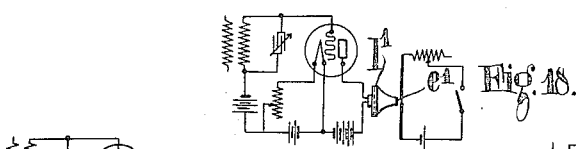
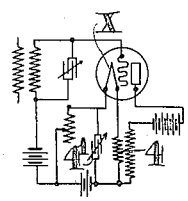

UNITED STATES PATENT OFFICE.

JOHN HETTINGER, OF LONDON, ENGLAND.

TELEGRAPHIC AND OTHER INSTRUMENTS AND INSTALLATIONS.

1,322,566. Specification of Letters Patent. Patented Nov. 25, 1919.

Application filed September 18, 1918. Serial No. 254,697.

*To all whom it may concern:*

Be it known that I, JOHN HETTINGER, a subject of the King of Great Britain and Ireland, and residing at 34 Ribblesdale road, Streatham, London, S. W. 16, England, have invented certain new and useful Improvements in and Relating to Telegraphic and other Instruments and Installations, of which the following is a specification.

This invention relates to optical instruments and arrangements capable of being used for various purposes, such as, broadly, for the conversion of acoustic phenomena into equivalent optical phenomena, the comparison of such acoustic phenomena by the converted equivalent optical phenomena, the detection and location of a source of sound, such as of an aeroplane or submarine, as a substitute for, or as an adjunct to, telephone receivers used in electric signaling with or without wires, as a means of selective or multiplex wireless and ordinary telegraphy, etc.

The invention broadly consists in an apparatus for optically indicating changes of energy, and comprising two or more illuminated sections arranged or adapted to be compared with each other, for instance, as in ordinary photometric apparatus, the illumination of all or some of which is varied by, and correspondingly to the magnitude of energy to be indicated, the source of which energy is different from that producing the initial illumination.

If all the illuminated sections are arranged to be under the control of the energy to be indicated, the comparison is effected between the various illuminated sections which are under such control; the arrangement may, however, be such that one or more of the illuminated sections is or are rendered independent of the said energy and is or are used as a unit of comparison for the illuminated sections, which are under the control of the same. The illumination of these independent sections may be constant, varied or adjusted, according to the special purpose in view.

The invention also consists in receiving arrangements for selective and multiplex telegraphy with or without wires in which use is made of the optical arrangement hereinbefore referred to for securing selectivity or multiplex reception; also in the use of such arrangement as a wave-meter for low or high frequency currents and generally for measuring and analyzing such currents.

The invention further consists in the use of the optical method referred to for detecting the direction or position of invisible air craft, submarines, or other sources of sound.

The invention also consists in the various arrangements hereinafter more particularly described for carrying into effect the invention hereinbefore broadly stated.

In the accompanying drawings illustrating the invention diagrammatically and by way of example, Figures 1, 2, $2^a$, $2^b$, $2^c$, 3, $3^a$, $3^b$, 4 and $4^a$ are diagrams illustrating the essence of the invention, and Figs. 5 to 20 illustrate various arrangement for carrying the invention into effect.

In order to render the essence and the scope of the invention quite clear, I will first refer to its general application to multiplex telegraphy and to the detection of invisible aircraft.

Referring first to its application to selective or multiplex telegraphy with or without wires, use is made at the receiving end, in a manner which is well known with such telegraphy, of a plurality of circuits which are selective with respect to some factor or other. There are many known methods by which such selectively can be produced: for instance, in some methods use is made of alternating or oscillatory currents of different high or low frequency; in other methods the differentiation is effected by using currents of a different nature, *e. g.*, alternating currents of low frequency and oscillatory currents of high frequency, continuous currents and alternating currents or continuous currents of different directions, etc.; again in the case of wireless telegraphy the selection may be effected by means of directional aerials. In all these selective methods the current operating a particular receiver is a function of the factor of selection, varying between a minimum and a maximum value, and the well known resonance curve for alternating currents of low or high frequency may be mentioned as an example in illustration of this point.

The fact that in practice, a particular receiver supposed to respond to certain selected signals is responsive to a less extent also to other signals, thereby causing interference, has led to a great number of suggestions for overcoming this drawback, whereby the whole receiving system is rendered more complicated without at the same time the disturbances caused by interference being completely overcome. The difficulty of coping with the problem is considerably increased with the increase in the number of transmitting stations.

The main object of the invention, so far as this application is concerned, is to overcome the drawback referred to.

Let us assume that $A^1$, $A^2$, $A^3$, $A^4$, $A^5$ and $A^6$ (see Fig. 1), are the resonance curves of the currents in six receiving oscillatory circuits tuned to the frequencies $m^1$, $m^2$, $m^3$, $m^4$, $m^5$ and $m^6$ respectively, and that these currents control the variation in the luminosity of six corresponding adjacent luminous sections $a^1$, $a^2$, $a^3$, $a^4$, $a^5$ and $a^6$ originally adjusted to present equal illumination (see Fig. 2). It will be seen that for all signals transmitted by means of currents of the frequency $m^3$, the optical receiver will present an illuminated surface as is diagrammatically shown in Fig. $2^a$, for all signals transmitted by means of currents of the frequency $m^5$ an illuminated surface as shown in Fig $2^b$, and for all signals simultaneously transmitted by means of the currents of frequencies $m^3$ and $m^5$ an illuminated surface as shown in Fig. $2^c$, the curves $B^3$, $B^5$ in Fig. 1 illustrating the current flowing through all the six circuits during this simultaneous transmission (viz., while the dots and dashes are superposed).

In order further to illustrate the essence of the invention as applied to multiplex telegraphy when all the six stations are operating at the same time, I will refer to a modified arrangement according to which an illuminated section $a$ which is not subject to any variation is interposed between each two of the six sections of varying luminosity (see Fig. 3). Assuming the six tuned circuits to be suitably connected with the line leading to the multiplex transmitting station, or to one end, and five intermediate transmitting stations, and that the frequencies of the currents transmitted by the various stations be chosen so far apart that they correspond to the lowest part of the resonance curves pertaining to all the other transmitting stations (compare for instance $m^2$ as corresponding to $A^2$ and to $A^1$, $A^3$ ... $A^6$, respectively). Let us further suppose that the maximum current flowing through each one of the tuned circuits to be chosen so that it shall have a certain value equal in all the circuits, viz., I′ max. (corresponding to $m^1$) equal to $I^2$ max. (corresponding to $m^2$), and so on, and that the ratio between the I max. and I min. corresponding to each one of the resonance curves $A^1$ ... $A^6$ be greater than the number of the stations, in the present example greater than six (Fig. 1). If we arrange that all the sections $a^1$ to $a^6$ of variable illumination shall be equally illuminated before any signals are received, to the extent diagrammatically represented by the surfaces $a^1$, $a^2$ ... $a^6$, in Fig. $3^a$, and that the sections $a$ of constant illumination be illuminated to an extent equal to or slightly smaller than $a^1$ plus the increased illumination caused by I max., as shown diagrammatically in Fig. $3^a$, it will easily be seen that irrespective of the number of stations operating simultaneously, each message will be readable, all dots and dashes pertaining to the messages received in the illuminated sections $a^1$ ... $a^6$ being determined by the corresponding greater or at least equal luminosity relatively to the luminosity of the adjacent section $a$, and all spaces between the dots and dashes of each message being necessarily of less luminosity relatively to the section $a$. For instance, it will be quite easy to ascertain that at a particular moment represented by the diagram of increased luminosity shown in Fig. $3^b$, the increased luminosity in sections $a^1$, $a^3$, $a^4$ and $a^5$ forms part of the corresponding messages, but that the increased luminosity, if detectable at all, in sections $a^2$, $a^6$, is not due to the transmission of any message corresponding to these sections.

If we dispense with the use of the adjacent sections $a$ of constant luminosity, the comparison is effected between the sections of varying luminosity, the messages being readable even in the case of signals of unequal strength, as is generally the case in wireless telegraphy, owing to the possibility of quantitatively analyzing the recorded messages by the differences in the degrees of luminosity due to the superposition of the effects being different in the various sections. For instance, the explanation given with respect to Figs. $2^a$–$2^c$, holds good irrespective of the relative magnitudes of the currents having the frequencies $m^3$ and $m^5$, respectively.

The quantitative differences between the energies acting upon the various sections of the optical device need not be caused by a selection with respect to frequency or other characteristics of the currents, as it may for instance be caused by the position of the primary cause relatively to the various sections of the device, as is for example the case in the application of the invention to directive wireless telegraphy and to the detection of submarines and invisible aircraft.

Referring to the application of the invention to the detection of aircraft, the "acoustic field" produced over a certain area on or near the surface of the earth is converted by the means provided by the present invention into an exactly corresponding "optical field", indicating at a glance the position of its maximum strength, thereby permitting the position of the maximum strength of the acoustic field, and consequently the position of the aeroplane to be located.

Assume the aircraft to be traveling over a certain area along a certain trajectory $b$, (see Fig. 4). At every moment during the flight of the aircraft along the said trajectory, the maximum strength of the acoustic field on the surface underneath, is exactly under the position momentarily occupied by the aircraft and gradually diminishes along concentric circles, that is to say, the point of maximum strength of the acoustic field is continuously shifting on the earth surface along a line which is determined by the intersection of the latter with the surface constituted by the vertical lines dropped from the various positions of the aircraft during the flight along its trajectory.

According to the invention I produce an "optical equivalent" or "image" of this continuous shifting of the maximum strength of sound along the said line of intersection, that is to say, I render it visible in a suitable apparatus provided at an observation point from which the orders are given to the gunners. I divide a map, chart or the like $c$ corresponding to the area in question (see Fig. $4^a$) into any desired number of square sections $d$, and cause all the sections to be slightly but equally illuminated during the period of complete stillness and the degree of illumination of each section to be under the control of the sound energy reaching the corresponding section of the area. It will thus be seen that during the flight of the aircraft along its trajectory $b$, the maximum strength of the acoustic field will shift along the vertical projection of the said trajectory, and that at the observation point, the various sections lying along the line $b^1$ corresponding to the vertical projection of the trajectory will in succession be more strongly illuminated than the remainder of the sections, and this at the very moments the air craft is passing over the corresponding sections of the area.

Having so far explained the essence of the invention as applied by way of example to multiplex telegraphy and to the detection of aircraft, I will now refer to the various modes of carrying the invention into effect.

Referring to the means for illuminating the sections to be compared with each other, the luminosity of such sections may be produced in various ways, for instance, by means of incandescent lamps, incandescent wires, manometric flames, etc., and the varying of their luminosity may be also effected in various ways. For instance, in the case of incandescent lamps or incandescent wires, a current due to, or controlled by the received energy may be superposed upon the current already flowing through the lamps or incandescent wires, and in the case of incandescent wires and manometric flames their luminosity may be controlled by a vibrating diaphragm, the vibrations of which are produced or controlled by the received energy.

Three typical arrangements illustrating the use of incandescent lamps, incandescent wires and manometric flames are illustrated by way of example in Figs. 5, 6 and 7, $7^a$.

Referring to Fig. 5 all the lamps $e^1, e^2 \ldots e^5$ are mounted in a frame $f$ and each lamp is provided with a reflector $g$, the front of which is square or oblong and filled up by a block of solid paraffin $h$. Each section is screened against the adjacent sections by very thin partitions $i$, or the reflectors above referred to may be used for this purpose. The reflectors together with the lamps may be arranged adjustably relatively to the blocks of paraffin in order to adjust the luminosity of each block. Each lamp circuit includes a variable resistance $j^1 \ldots j^5$, and all the lamp circuits are connected together to a common large resistance $j^6$ and to a common battery $k$. Each lamp is in addition thereto included in a circuit comprising a condenser $k^1—k^5$ and the secondary winding of a transformer $s^1 \ldots s^5$, the current through the primary winding of which is due to or is controlled by the received energy.

Referring to Fig. 6, a series of incandescent wires $e^1 \ldots e^5$, each one connected in series with a variable resistance $j^1 \ldots j^5$, and all in parallel across a battery $k$, are arranged to be influenced by the air movement produced by a series of vibrating diaphragms $l^1 \ldots l^5$, respectively, which may be a series of telephone receiver diaphragms associated with any known form of sound directing means adapted to concentrate the energy of the air movement upon the incandescent wires, for instance as shown.

Figs. 7 and $7^a$, illustrate in cross-section and sectional plan, respectively, an arrangement in which use is made of manometric flames $e^1 \ldots e^V$, each flame of which is caused to be varied by the vibrations of a corresponding diaphragm $m$ arranged in a manometric capsule $n$ and vibrated by means of electromagnets $o$ such as used in telephone receivers.

Instead of causing the diaphragms used in conjunction with the arrangements illustrated in Figs. 6, 7, and $7^a$, to be operated by means of telephone receivers or like electromagnets, they may be arranged to vibrate under the direct action of the source of sound without the intermediate conversion of the sound into electrical energy. In Fig. 8 which illustrates such an arrangement, M is a diaphragm inclosed in a box $M^1$ and capable of being set in vibration by an outside source of sound, m is the diaphragm of a Koenig's manometric capsule n, and M² is a rubber or other sound insulated tube through which the vibrations of the diaphragm M are communicated to the diaphragm m. The manometric capsules n connected to the optical device are arranged in the proximity of the latter, while the boxes M¹ in which the vibrating diaphragms M are mounted, are distributed in the various positions where the sound is to be picked up, for instance, in the case of submarine detection, at various points around the hull of a ship.

Figs. 9, 9ª illustrate an arrangment in which each section is illuminated by means of a lamp e, the luminosity of which is kept constant, the variation of the luminosity of the section being effected by means of a vibrating shutter E¹ provided with narrow slits E² and arranged in front of a screen E³ provided with similar slits. The said shutter and screen are arranged between an opal glass H¹ and an opal glass H², the latter forming the front part of the optical device, and the former being intended to diffuse the light reaching the screen and the shutter. In this arrangment, the shutter E¹ is vibrated under the control of a corresponding electromagnet E⁴, the varied luminosity of each section being determined by the amount of movement of the shutter E¹ during the operation of the device.

In some of the applications of the invention, the energy for effecting the variation in luminosity is very small, and a further object of the invention is to produce an optical arrangment, the sensitiveness of which shall be greatly increased as compared with that which can be attained by the means hitherto proposed.

This object is attained by the use of a very small incandescent body, hereinafter referred to as the "incandescent point" the incandescence of which is maintained by a very small potential difference, which is a fraction, preferably the smallest effective fraction of the potential employed in connection with the smallest electric incandescent lamps as hitherto constructed, and is arranged to be influenced under the control of the primary cause, for instance such as described with reference to Figs. 5 and 6. In both these arrangements, the energy required for producing a change in brightness can in this way be substantially reduced, as compared with that ordinarily required when a maximum amount of luminosity is the primary consideration.

The essence of this part of the invention is based upon the following well known experimental facts.

The human eye is capable of detecting an intensity of light of the order of $10^{16}$ watt, and of detecting a difference of brightness of 2%. Therefore, if we make use in the optical device of an "incandescent point" in the sense above referred to, we are able to produce the required difference of brightness of 2% by a very small energy as compared with the energy that would be required to produce such a difference of brightness, say, for instance, in a 2 volt incandescent lamp of small candle power.

It is also experimentally known that the increase in brightness of electrical incandescent lamps subjected to variations of potential, increases with the ratio $$\frac{\triangle E}{E}.$$

Consequently, by reducing the potential across the incandescent body to the much smaller potential E required for an "incandescent point" we are able to produce the required difference of 2% brightness by the superposition thereon of a substantially smaller difference of potential $\triangle E$, as compared with that which would be required for producing the same difference of brightness by means of 2 volts across the incandescent body, whereby the sensitiveness of the device with respect to small energy is considerably increased.

Assuming that a difference of 2% brightness corresponds to a ratio $$\frac{\triangle E}{E}$$

of about 0.3%, it will be seen that if we reduce the length of the incandescent portion of the filament to 0.01 of its present length in 2 volt lamps, the potential E required for producing the incandescence of such length of filament will be 0.02 volt, while the potential $\triangle E$ of 0.3% of E for producing the difference of brightness of 2% will be 0.06 millivolt. I wish it to be understood that these figures are only given by way of example, and mainly with the object of illustrating the essence of this part of the invention.

The "incandescent point" may be obtained by replacing the filament of a 2 volt incandescent lamp by a very minute length of filament capable of being rendered incandescent by the same strength of current as required for an ordinary 2 volt lamp, the said "incandescent point" being connected in series with a resistance and the two being connected across the 2 volt battery and having together a resistance equal to that of an ordinary incandescent 2 volt lamp.

The resistance in series with the "incandescent point" preferably consists of a very short lamp filament of slightly larger section than that of the "incandescent point" and forming a continuation at both ends of the "incandescent point" by which the latter is connected with the ordinary leads within the bulb, the arrangement being such that the current required for rendering the "incandescent point" effective will not be sufficient to bring the said filament in series therewith to incandescence. The combined "incandescent point" and non-luminous filament may be formed by reducing the section of the filament of larger section at the position of the "incandescent point" by pressure applied thereto by means of a die which imparts a slightly tapered shape to this part of the filament as shown on a greatly enlarged scale in Fig. 10.

Referring to the well known radiation curve, we wish it to be understood that any part of the optical portion of the radiation is intended to come within the scope of the present invention. Sufficient local energy is supplied to the incandescent body to bring it originally to a certain degree of detectable or hardly detectable luminosity which luminosity is subsequently varied (increased or decreased) by the energy supplied by or quantitatively liberated under the control of the primary cause intended to act upon the optical device.

The smaller the energy originally supplied to the device, the more responsive is the same to small energies. For this reason, the device is preferably operated at a low luminosity, and in the case of incandescent filaments or wires, in the red part of the spectrum; it is, however, to be understood that the lamps or wires may be used at any other degree of incandescence.

I will now refer to the various specific applications of the invention.

Fig. 11 of the accompanying drawings illustrates one arrangement according to the invention as applied to multiplex telegraphy, in which the receiver is intended to be operated by impulses or alternating currents of low or high frequency. $q^1$, $q^2$ are two lines connecting the receiving station to a distant transmitting station. In the case of wireless telegraphy, these lines are replaced by an aerial and an earth connection respectively, as shown in Fig. 11$^a$. $r^1$, $r^2$ . . . $r^5$ are primary windings of transformers arranged in series with each other in the line or in the aerial circuit, it being obvious that they may be arranged in parallel instead of in series. In the arrangement illustrated in Fig. 11$^a$, the primary windings $r^1$ . . . $r^5$ form closed circuits with adjustable self-inductances $R^1$ . . . $R^5$ and adjustable condensers $S^1$ . . . $S^5$, each circuit being capable of being disconnected by means of switches $T^1$ . . . $T^5$, respectively, and of being tuned to a particular and different frequency. The secondary windings $t^1$ . . . $t^5$ of the transformers form each a closed circuit with a variable condenser $u^1$ . . . $u^5$ and variable self-inductance $v^1$ . . . $v^5$, respectively, each of these circuits being tuned to a particular and different frequency. The various lamps $x^1$ . . . $x^5$ are arranged in the latter tuned circuits, being embodied in an optical device such as described with reference to Fig. 5, which device is preferably provided with intermediate luminous sections (as referred to in connection with the diagrams Figs. 3 and 3$^a$) illuminated by incandescent lamps $y$ of constant luminosity, receiving current from a battery $v$ through variable resistances $y^1$.

The various resistances $j$ associated with the lamps $x$ are preferably made to possess a large inductance.

The messages received are preferably recorded by well known photographic means, which do not however form part of the present invention.

It will be seen that by arranging that the receiver shall comprise a series of circuits tuned to a great number of acoustic or electric frequencies, each circuit being associated with an illuminated section, and all the sections being so arranged that they can easily be compared with one another or with an independent illuminated section of constant illumination, we produce a kind of spectrum extending over the whole gamut of the frequencies to which the various circuits are tuned. The arrangement thus permits of recording a great number of messages received from different stations, the overlapping of the various messages being such as not to disturb the legibility of either of the messages owing to the fact that the record indicates the various degrees of illumination.

Referring more particularly to the application of the above arrangement to wireless telegraphy as illustrated in Fig. 11$^a$, it is to be pointed out that the possibility of including the lamps in the actual oscillatory circuits is due to the fact that (as compared with most of the detectors of wireless telegraphy as now in use) the lamps employed are of a sufficiently small resistance not to have a large effect upon the damping of the oscillations. It is also to be pointed out that the lamps act simultaneously as detectors and as indicators, and that their acting as indicators is due to the fact that they are equally responsive to high frequency currents and do not require an intermediate device such as a rectifying detector or the like for converting the high frequency oscillations into unidirectional currents or into currents of lower frequency. The incandescent bodies used according to the present invention are less sensitive than the detectors now in use. It is however to be pointed out that in the usual arrangements for wireless telegraphy in which a detector of high frequencies is used in combination with a telephone or other indicator of high resistance for shunting off a portion of the total energy flowing in the closed oscillatory circuit, a large amount of energy remains unutilized in the latter circuit. This loss does not take place in the arrangement according to the present invention, when small incandescent bodies are inserted directly in the oscillatory circuits and are employed both as detectors and as indicators, so that the larger energy they require for being operated is available for them, while this is not the case with the detectors now in use. On the other hand, however, the disadvantage of the decreased sensitiveness is to a large extent compensated by the great advantage of the possibility of multiplex reception.

The invention is also useful in such cases of wireless installations where reception by telephone is difficult as, for instance, in the case of flying aeroplanes; also in balancing systems where differentially wound telephones or similar devices have hitherto been employed, for instance, for the purpose of preventing interference. Two arrangements especially useful for these purposes are illustrated by way of example in Figs. 12 and 13, respectively.

In the arrangement illustrated in Fig. 12, the luminosity of the lamp $x$ associated with the oscillatory circuit coupled to the aerial is compared with the luminosity of the lamp $y$ which is kept constant and is not under the influence of the received energy.

In the arrangement illustrated in Fig. 13, the aerial is coupled to two closed oscillatory circuits I II which are associated with the lamps $x^1$ and $x^2$, respectively, one of these circuits being tuned to a particular selected frequency, and the natural frequency of the other circuit being kept different from the natural frequency of the first circuit and being varied upon the reception of an interfering signal until the corresponding energies in the two circuits are equal, such as described in British specification No. 4965 of 1906. It will thus be seen that for all interfering signals however strong, the optical device will indicate no difference in luminosity between the two sections, and that such a difference will only be detected when signals to which the circuit I is tuned are received.

Instead of utilizing the device as a receiver for multiplex telegraphy, it may be employed as a receiver for high speed telegraphy, the transmitting currents of different frequencies being in this case employed simultaneously for the formation of letters or code words.

The invention may also be applied to the utilization of the method referred to in the construction of instruments for analyzing alternating currents with respect to the frequency factor, and more particularly in the construction of wave-meters and decremeters in connection with high frequency currents.

A wave-meter constructed according to the present invention, may consist of a closed oscillatory circuit comprising a winding 1, (see Fig. 14), for effecting a loose coupling with an aerial or other circuit, a variable self-inductance 2, a variable condenser 3, and a lamp $x$, associated with the lamp $y$ as described with reference to Fig. 12.

The improved wave-meter may be used as follows:—

Starting with a very low and equal illumination in the two sections of the optical device, the self-inductance or capacity of the oscillatory circuit or both are varied until a maximum illumination is obtained in the section of the lamp $x$; the resistance in the circuit of the lamp $y$ is thereupon altered until the illumination is the same in the two sections and the final adjustment is obtained by altering the illumination of both sections in the near proximity of the maximum illumination. A milliammeter MA may be inserted in the circuit of the lamp $y$ for determining the increase in current in the lamp $x$ due to the oscillatory current, or such increase may be determined by the variation which was effected in the resistance connected with the lamp $y$ for obtaining equality of illumination in the two sections. Alternatively, the current induced in the oscillatory circuit and superposed upon the current already flowing through the lamp $x$ may be determined in the usual photometric way by moving either the lamp $x$ or the lamp $y$ relatively to the respective blocks of paraffin in the optical device.

Fig. 15 illustrates an arrangement in which the present invention is employed for measuring the maximum current in an aerial circuit, the lamp $x$ being placed near the earthing point of the aerial and the current being measured in the manner described with reference to Fig. 14.

It will be seen that in either of the arrangements illustrated in Figs. 11 and 11ª, a luminous section which has a lamp inserted in the alternating or oscillatory circuit, and an adjacent section having a lamp which is not under the control of the alternating or oscillatory current, may be used together and in combination with the corresponding circuits in order either to determine the frequency of the alternating or oscillatory current or to measure its intensity.

Instead of inserting the lamps $x$ in the various oscillatory circuits in the manner hereinbefore referred to, they may be arranged to be under the influence of the received energy in any other manner, and Fig. 16 illustrates by way of example an arrangement in which the lamp $x$ is operated through the intermediary of a vacuum valve, while Fig. 17 shows an arrangement in which the filament of the valve is used at the same time as the indicating lamp.

Referring to Fig. 16 the connection between the lamp circuit and the anode circuit of the valve is effected through the intermediary of a stepdown transformer 4, the secondary winding of which in series with the lamp has a small resistance; the circuit of the secondary of the transformer and of the lamp, preferably includes a condenser 5 and a variable self-inductance 6 for tuning purposes.

In the arrangement illustrated in Fig. 17 in which the filament $x$ of the valve is employed at the same time as the indicating lamp, the incandescence of the filament is caused to be varied preferably by the use of a stepdown transformer 4 inserted between the anode circuit and the filament circuit and a variable condenser 41, as shown.

Fig. 18 illustrates a further modification in which the telephone receiver $l^1$ arranged in the plate circuit of a valve is provided with means for directing the energy of the vibrations of its diaphragm on to an incandescent wire as described with reference to Fig. 6.

Referring to the application of the invention to the detection of invisible aircraft, the methods of converting the acoustic fluid into an equivalent optical field as hereinbefore referred to may be carried out as follows:—

Referring to Fig. 19, a microphone $B^1$, $B^2$ ... $B^{100}$ is provided in each one of the sections of the area indicated in Fig. 4, preferably as nearly as possible to the center of the section, and the same is connected with the primary of a corresponding transformer, $C^1$, $C^2$ ... $C^{100}$, and common battery D and switch F located at the observation station. The secondary of each of the transformers is connected to a corresponding low voltage lamp $e^1$, $e^2$ ... $e^{100}$, all of which receive the necessary current for rendering them incandescent from a common battery G, through a switch J, and their incandescence is regulated by means of variable resistances $L^1$, $L^2$ ... $L^{100}$, respectively. The lamps $e^1$, $e^2$ ... $e^{100}$ are arranged to illuminate the respective sections $d$ as described with reference to Fig. 4ª.

Instead of interconecting the lamp and microphone circuits as above referred to, they may be interconnected through a microphone relay or valve relay such as is used in wireless telegraphy, for amplifying the current proportionally, e. g., such as described with reference to Fig. 16.

The drawback that in this application of the invention the apparatus will also be responsive to other sounds, such as those produced by running trains, etc., may be overcome by the provision of a telephone receiver N adapted to be inserted in any of the lamp circuits by means of a switch P, by which it could be ascertained whether the increased luminosity is due to such a source or to the aircraft.

Instead of distributing the various microphones along a surface, they may be distributed along one, two or more lines arranged across the probable passage of the aircraft or along such probable passage thereof.

The series of microphones may be placed at determined distances apart from each other, being suspended, for instance, from a captive balloon. Such an arrangement may be used for the purpose of determining the altitude of the aeroplane, and be used in conjunction with the apparatus locating the actual position of the aeroplane.

Instead of connecting a great number of microphones distributed over the whole area, to a common central observation point, two, three or more microphones may be connected to the indicating apparatus which, in this case, may be arranged at the firing point. Each one of these instruments may comprise an illuminated section which is under the control of the microphone at the point where the instrument is situated, and which is arranged between two illuminated sections under the respective control of the microphones disposed at the right and left locating sections respectively.

According to another arrangement, the locating station may comprise nine illuminated sections $d$ arranged in a square, as shown in Fig. 20, the central section being under the control of the microphone situated in the locating station, while the other eight illuminated sections are under the control of the microphones distributed over the surface of the earth in the same relation as in the locating instrument. Such a locating station will permit one to follow the movement of the aeroplane and locate its actual position within the area corresponding to the central illuminated section by the difference in illumination between the various sections, more especially when used in conjunction with two additional groups of sections each of which comprises four sections, as shown in the same figure.

If we number the nine sections of the larger group as 1, 2, 3, 4, 5, 6, 7, 8 and 9 respectively, and we group together, on the one hand the sections 2, 4, 6, 8, and on the other hand, the sections 1, 3, 7, 9, in the order indicated in the figure, it will be seen that when the aircraft reaches the area corresponding to section 5, which will be more strongly illuminated than any of the other sections, the relative luminosity in the smaller groups will indicate, over which one of the eight sectors marked on that section, the aircraft is flying at any particular moment. For instance, when the aircraft is over the upper right hand sector of section 5, which is marked with a cross, section 2 will be the most illuminated section in the one of the two smaller groups, and section 3, the most illuminated section in the other smaller group, when the aircraft is over the sector marked with a circle, section 8 in the one and section 9 in the other of the two smaller groups will be the most illuminated sections in these two groups, and so on.

According to another arrangement, instead of controlling the illuminated sections by means of distant microphones, they may be controlled by a plurality of microphones or like devices arranged at the locating station and capable of indicating the direction of the source of sound. In this case, the comparison between the various illuminated sections will not be an indication of the actual position of the aeroplane, but will nevertheless give an automatic indication of the direction of the source of sound.

Referring to the application of the invention to the location of submarines; the various microphone or sound detecting devices hitherto employed in connection with such location, are arranged to control the various illuminated sections in the manner hereinbefore described, the relative position of the submarine being determined by the comparison between the various illuminated sections. It will be seen that also in this case the indication will be automatic as in the case referred to in connection with the detection of aircraft.

The invention may also be applied to the scientific investigation of acoustic phenomena in general, for the testing of sound-producing devices, and measurements of all kinds wherein telephones have hitherto been employed.

I wish it to be understood that the invention is not limited to the means and modes of application hereinbefore more particularly referred to, which may be modified in various respects without departing from the essence of the invention.

I also wish it to be understood that the photometric arrangement according to the present invention is always intended to be used in connection with sources of energy other than those producing the initial luminosity of the luminous sections, the expression "additional means for quantitatively conveying the changes of energies to be indicated" used in the claims being intended to cover the means of interconnection between the luminous sections, the luminosity of which is quantitatively to be varied, and a source or sources of energy different from that producing the initial luminosity of the sections.

Having now described my invention, what I claim as new and desire to secure by Letters Patent is:—

1. An apparatus for optically indicating changes of energies comprising more than one luminous section capable of being compared with one another, means for producing and maintaining the luminosity of such sections and additional means for quantitatively conveying the changes of energies to be indicated to, and capable of correspondingly varying the luminosity of at least one of the luminous sections, as and for the purposes set forth.

2. An apparatus for optically indicating changes of energies comprising a plurality of adjacent luminous sections, means for producing and maintaining the luminosity of such sections, and additional means for quantitatively conveying the changes of energies to be indicated to, and capable of correspondingly varying the luminosity of, some of the luminous sections, as and for the purposes set forth.

3. An apparatus for optically iudicating changes of energies comprising more than one luminous section capable of being compared with one another, means for producing and maintaining the luminosity of such sections and additional means for quantitatively conveying the changes of energies to be indicated to, and capable of correspondingly varying the luminosity of at least one of the luminous sections, the latter means being rendered selective with respect to the energies to be indicated, as and for the purposes set forth.

4. A receiving system of telegraphy comprising more than one luminous section capable of being compared with one another, means for producing and maintaining the luminosity of such sections, and additional means for quantitatively conveying the energy of the received signals and capable of correspondingly varying the luminosity of at least one of the luminous sections, as and for the purposes set forth.

5. A receiving system of electric telegraphy comprising more than one luminous section, capable of being compared with one another, means for producing and maintaining the luminosity of such sections, and additional electric means for quantitatively conveying the electric energy of the signals to, and capable of correspondingly varying the luminosity of, at least one of the luminous sections, as and for the purposes set forth.

6. A receiving system of electric telegraphy comprising more than one luminous section, capable of being compared with one another, means for producing and maintaining the luminosity of such sections, and additional electric means for quantitatively conveying the electric energy of the signals to, and capable of correspondingly varying the luminosity of, at least one of the luminous sections, the latter means being capable of being rendered selective with respect to the signals which are received, as and for the purposes set forth.

7. A receiving system of multiplex electric telegraphy comprising a plurality of luminous sections capable of being compared with one another, means for producing and maintaining the luminosity of such sections, and additional electric selective means for quantitatively conveying the electric energy of the signals to, and capable of correspondingly varying the luminosity of, the luminous sections, as and for the purposes set forth.

8. A receiving system of multiplex electric telegraphy comprising a first series of luminous sections, means for producing and maintaining constant the luminosity of such sections, a second series of luminous sections, alternately arranged between the luminous sections of the first series, means for producing and maintaining the luminosity of such sections, and additional electric selective means for quantitatively conveying the electric energy of the signals to, and capable of correspondingly varying the luminosity of, the second series of luminous sections, as and for the purposes set forth.

9. A receiving system of multiplex electric telegraphy by means of currents of definite and different frequencies comprising a plurality of luminous sections capable of being compared with one another, means for producing and maintaining the luminosity of such sections and additional alternating current circuits individually connected with the respective luminous sections for quantitatively conveying the electric energy of the signals to, and capable of correspondingly varying the luminosity of, the luminous sections, the said circuits being tuned to different frequencies, as and for the purpose set forth.

10. An apparatus for optically indicating changes of energies comprising more than one luminous section capable of being compared with one another, incandescent resistances for illuminating such sections, means for sending a current through the incandescent resistances, means for maintaining the luminosity of all sections constant, and additional means for quantitatively conveying the changes of energies to be indicated to, and capable of correspondingly varying the luminosity of, the incandescent resistances of, at least one of the luminous sections, as and for the purposes set forth.

11. An apparatus for optically indicating changes of energies comprising more than one luminous section capable of being compared with one another, incandescent resistances for illuminating such sections, means for sending a current through the incandescent resistances, variable resistances in series with the incandescent resistances and adjusted to maintain the latter at a low degree of incandescence, and additional means for quantitatively conveying the changes of energies to be indicated to, and capable of correspondingly varying the luminosity of, the incandescent resistance of at least one of the luminous sections, as and for the purposes set forth.

12. An apparatus for optically indicating changes of energies comprising more than one luminous section capable of being compared with one another, incandescent resistances consisting of "incandescent points" for illuminating such sections, means for sending a current through the "incandescent points," means for maintaining the luminosity of all sections constant, and additional means for quantitatively conveying the changes of energies to be indicated to, and capable of correspondingly varying the luminosity of, the "incandescent point" of at least one of the luminous sections, as and for the purposes set forth.

13. An apparatus for optically indicating changes of energies comprising more than one luminous section capable of being compared with one another, incandescent resistances consisting of "incandescent points" for illuminating such sections, each "incandescent point" being formed in the middle of a filament of slightly larger cross-section, means for sending a current through the "incandescent points," means for maintaining the luminosity of all sections constant, and additional means for quantitatively conveying the changes of energies to be indicated to, and capable of correspondingly varying the luminosity of, the "incandescent point" of at least one of the luminous sections, as and for the purposes set forth.

14. A receiving system of wireless telegraphy by means of high frequency currents, comprising more than one luminous section capable of being compared with one another, means for producing and maintaining the luminosity of such sections, and additional electric means for quantitatively conveying the electric energy of the signals to, and capable of correspondingly varying the luminosity of, at least one of the luminous sections, as and for the purposes set forth.

15. A receiving system of wireless telegraphy by means of high frequency currents, comprising more than one luminous section capable of being compared with one another, means for producing and maintaining the luminosity of such sections, and additional electric means for quantitatively conveying the electric energy of the signals to, and capable of correspondingly varying the luminosity of, at least one of the luminous sections, the latter means being capable of being rendered selective with respect to the signals which are received, as and for the purposes set forth.

16. A receiving system of multiplex wireless telegraphy by means of high frequency currents, comprising a plurality of luminous sections capable of being compared with one another, means for producing and maintaining the luminosity of such sections, and additional electric selective means for quantitatively conveying the electric energy of the signal to, and capable of correspondingly varying the luminosity of, the luminous sections, as and for the purposes set forth.

17. A receiving system of multiplex wireless telegraphy by means of high frequency currents, comprising a first series of luminous sections, means for producing and maintaining constant the luminosity of such sections, a series of luminous sections, alternately arranged between the luminous sections of the first series, means for producing and maintaining the luminosity of such sections, and additional electric selective means for quantitatively conveying the electric energy of the signals to, and capable of correspondingly varying the luminosity of, the second series of luminous sections, as and for the purposes set forth.

18. A receiving system of multiplex wireless telegraphy by means of currents of definite and different high frequencies, comprising a plurality of luminous sections capable of being compared with one another, means for producing and maintaining the luminosity of such sections, and additional high frequency circuits individually connected with the respective luminous sections, for quantitatively conveying the electric energy of the signals to, and capable of correspondingly varying the luminosity of, the luminous sections, the said circuits being tuned to different frequencies, as and for the purposes set forth.

19. A receiving system of wireless telegraphy by means of high frequency currents, comprising more than one luminous section capable of being compared with one another, incandescent resistances for illuminating such sections, means for sending a current through the incandescent resistances, means for maintaining the luminosity of all sections constant, and high frequency circuits for quantitatively conveying the electric energy of the signals to, and capable of correspondingly varying the luminosity of, the incandescent resistance of at least one of the luminous sections, as and for the purposes set forth.

20. A receiving system of wireless telegraphy by means of high frequency currents, comprising more than one luminous section capable of being compared with one another, incandescent resistances for illuminating such sections, means for sending a current through the incandescent resistances, variable resistances in series with the incandescent resistances and adjusted to maintain the latter at a low degree of incandescence, and high frequency circuits for quantitatively conveying the electric energy of the signals to, and capable of correspondingly varying the luminosity of, the incandescent resistance of at least one of the luminous sections, as and for the purposes set forth.

21. A receiving system of wireless telegraphy by means of high frequency currents, comprising more than one luminous section capable of being compared with one another, incandescent resistances consisting of "incandescent points" for illuminating such sections, means for sending a current through the "incandescent points", means for maintaining the luminosity of all sections constant, and high frequency circuits for quantitatively conveying the electric energy of the signals to, and capable of correspondingly varying the luminosity of "the incandescent point" of at least one of the luminous sections, as and for the purposes set forth.

22. A receiving system of wireless telegraphy by means of high frequency currents, comprising more than one luminous section capable of being compared with one another, incandescent resistances consisting of "incandescent points" for illuminating such sections, each "incandescent point" being formed in the middle of a filament of slightly larger cross-section, means for sending a current through the incandescent points, means for maintaining the luminosity of all sections constant, and high frequency circuits for quantitatively conveying the electric energy of the signals to, and capable of correspondingly varying the luminosity of, the "incandescent point" of at least one of the luminous sections, as and for the purposes set forth.

23. A receiving indicating device for wireless telegraphy by means of high frequency currents, comprising an incandescent resistance, means for normally maintaining the said resistance incandescent, and an oscillatory circuit, the incandescent resistance being arranged to form part of the oscillatory circuit, and its total electrical resistance being sufficiently small not to prevent the formation of electric oscillations, whereby the incandescence of the said resistance is varied by the superposition of the oscillatory current due to the received signals so that the incandescent resistance can be used as an indicator of the wireless signals, as set forth.

24. A receiving system of multiplex wireless telegraphy by means of high frequency currents, comprising a plurality of luminous sections capable of being compared with one another, incandescent resistances for individually illuminating such sections, means for maintaining the said resistances incandescent, and oscillatory circuits tuned to different frequencies, the incandescent resistances being arranged individually to form part of the individual oscillatory circuits, and the total electrical resistance of each incandescent resistance being sufficiently small not to prevent the formation of electric oscillations, as and for the purposes set forth.

25. A wave-meter for oscillatory currents comprising a luminous section, an incandescent resistance for illuminating the said section, means for maintaining the incandescence of the said resistance, and an adjustable resistance in series with the incandescent resistance, a second luminous section adjacent to the first section, a second incandescent resistance for illuminating the second section, means for maintaining the incandescence of the second incandescent resistance, a second adjustable resistance in series with the second incandescent resistance, and an oscillatory circuit, the natural frequency of which is capable of being altered, the second incandescent resistance being inserted in the said oscillatory circuit, as and for the purposes set forth.

26. A current measuring device for oscillatory currents comprising a luminous section, an incandescent resistance for illuminating the said section, means for maintaining the incandescence of the said resistance, a second luminous section adjacent to the first luminous section, a second incandescent resistance for illuminating the second section, means for maintaining the incandescence of the second incandescent resistance, a second adjustable resistance in series with the second incandescent resistance, and an oscillatory circuit, the second incandescent resistance being inserted in the said oscillatory circuit, as and for the purposes set forth.

In testimony whereof I have signed my name to this specification.

JOHN HETTINGER.